Patented Oct. 17, 1950

2,525,786

UNITED STATES PATENT OFFICE 2,525,786

POLYHYDRIC ALCOHOL ESTERS OF ACYLOXYCARBOXYLIC ACIDS

Edward M. Filachione, Philadelphia, Pa., Martin L. Fein, Riverside, N. J., and Charles H. Fisher, Abington, Pa., assignors to United States of America as represented by the Secretary of Agriculture No Drawing. Application June 18, 1948, Serial No. 33,838

10 Claims. (Cl. 260—484)

(Granted under the act of March 3, 1883, as amended April 30, 1928; 370 O. G. 757)

This application is made under the act of March 3, 1883, as amended by the act of April 30, 1928, and the invention herein described, if patented in any country, may be manufactured and used by or for the Government of the United States of America for governmental purposes throughout the world without the payment to us of any royalty thereon.

This application is a continuation-in-part of our copending application for patent, Serial No. 770,179, filed August 22, 1947, the disclosure of which is incorporated herein by reference.

This invention relates to esters of polyhydric alcohols and more particularly to acyloxycarboxylic acid esters of polyhydric alcohols, and has among its objects the provision of new compositions of matter and processes for their preparation. Other objects and advantages of the invention will be apparent from the description of the invention.

We have found that esters of acyloxycarboxylic acids, which possess valuable properties as solvents, plasticizers and modifying agents for plastic compositions, can be obtained by reacting a polyhydric alcohol, such as pentaerythritol and polypentaerythritols, with an ester of a hydroxycarboxylic acid and treating the resulting polyhydric alcohol ester of the hydroxycarboxylic acid thus formed by alcoholysis, with an organic acylating agent.

According to this invention, the pentaerythritol or polypentaerythritol is heated at reaction temperature with a lower alkyl ester of a hydroxycarboxylic acid, preferably in the presence of a reaction catalyst, with concurrent removal from the reaction mixture of the alkanol formed in the alcoholysis reaction. The resulting polyester is then acylated by interaction with an organic acylating agent to form a compound of the general formula

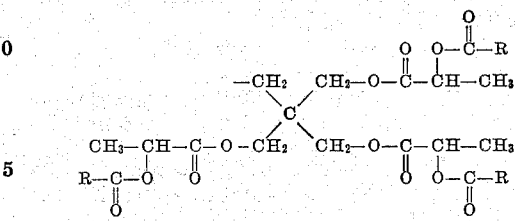

wherein R is a lower alkyl and R' is a member of the group consisting of

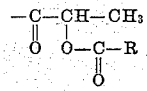

and

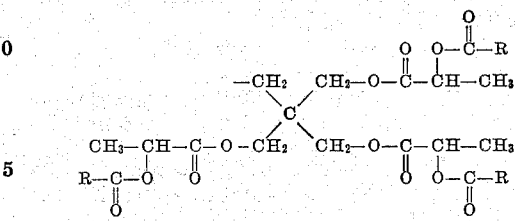

wherein R has the same significance as above.

Esters of hydroxycarboxylic acids suitable for use in the process of this invention are the lower alkyl esters such as methyl, ethyl or propyl esters of the lower, saturated, aliphatic, alpha-hydroxy monocarboxylic acids like glycolic, lactic or alpha-hydroxyisobutyric acids.

Suitable alcoholysis catalysts include acidic substances such as sulfuric and toluene sulfonic acids, as well as other esterification catalysts such as metal alcoholates like aluminum epoxide or isopropoxide.

The hydrooxycarboxylic acid esters formed by alcoholysis are acylated in a conventional manner by treatment with an acylating agent. Suitable acylating agents include ketene and anhydrides or halides of carboxylic acids like acetic anhydride, propionic anhydride, acetoxypropionyl chloride, pelargonyl chloride and the like.

The following Examples I through IV illustrate the production of the esters of this invention.

EXAMPLE I

*Preparation of pentaerythritol tetraacetoxypropionate*

A mixture of 68 g. (0.5 mole) pentaerythritol, 416 g. (4 mole) methyl lactate and 1 g. p-toluene sulfonic acid was heated at atmospheric pressure in a flask fitted with a 2-foot Vigreaux-type distilling column. Approximately 130 cc. of methanol distilled from the reaction mixture over a period of about 12 hours while the temperature of the reaction mixture was gradually raised from 106° to 185° C. A small amount of low-boiling material was then removed by heating the contents of the flask under a vacuum of 2–3 mm. until distillation ceased.

The distillation residue, consisting essentially of pentaerythritol tetralactate, was treated with 306 g. (3 mole) of acetic anhydride containing several drops of concentrated sulfuric acid as catalyst. On completion of the acylation reaction, the catalyst was neutralized with powdered calcium carbonate, and activated charcoal was added to the reaction mixture. Acetic acid, excess acetic anhydride and any other low-boiling materials that might have been present were removed by vacuum distillation. The filtered distillation residue consisted essentially of pentaerythritol tetraacetoxypropionate having the following characteristics:

$N_D^{20} = 1.4492$
$d_4^{20} = 1.2116$
Ester equivalent = 74.2

EXAMPLE II

*Preparation of pentaerythritol tetrapropionoxypropionate*

Using a procedure similar to the one described in Example I, and using propionic anhydride as the acylating agent, pentaerythritol tetrapropionoxypropionate was prepared. It was found to have the following characteristics:

$N_D^{20} = 1.4490$
Ester equivalent = 81.1 (theoretical); 80.8 (observed)

EXAMPLE III

*Preparation of dipentaerythritol hexaacetoxypropionate and hexapropionoxypropionate*

Using the ester-interchange procedure described in the foregoing example, approximately 300 ml. of methanol were distilled from a mixture of 254 g. (1 mole) dipentaerythritol and 1248 g. (15 mole) methyl lactate containing 10 drops of concentrated sulfuric acid as catalyst. Excess methyl lactate was then recovered by vacuum distillation and the residual material, consisting essentially of dipentaerythritol hexalactate, was divided in two equal portions for acylation with acetic and propionic anhydride respectively. Each portion was acylated with slightly more than 3 mole of the corresponding anhydride. After distillation of the acid formed in the reaction and the small amount of excess anhydride the acylated product was washed acid free with dilute sodium bicarbonate solution and water. The products thus obtained had the following characteristics:

Dipentaerythritol hexaacetoxypropionate
  $N_D^{20} = 1.4491$
  $d_4^{20} = 1.2032$
  Ester equivalent = 79.4
Dipentaerythritol hexapropionoxypropionate
  $N_D^{20} = 1.4490$
  $d_4^{20} = 1.1636$
  Ester equivalent = 85.2

EXAMPLE IV

*Preparation of tripentaerythritol octapropionoxypropionate*

Using a procedure similar to that described in Example III, commercial grade tripentaerythritol was treated with methyl lactate with $H_2SO_4$ as a catalyst. The residue, after distilling excess methyl lactate, was treated with propionic anhydride. The acylated product, tripentaerythritol octapropionoxypropionate, washed and dry, was light in color.

$N_D^{20} = 1.4545$;
Ester equivalent = 89.2

In the foregoing examples methyl lactate can be replaced by an equivalent amount of another lower alkyl ester of lactic acid, such as ethyl or propyl lactate, and other esterification catalysts, for example, aluminum propoxide or ethoxide, may be used in the alcoholysis reaction. The resulting esters can be acylated by means of other acylating agents, such as acetyl chloride, propionyl chloride, pelargonyl chloride and the like.

The following Examples V through IX illustrate the use of the compounds of this invention with synthetic plastics, such as organic cellulose esters, cellulose ethers, and polyvinyl compounds, in the production of plastic composition.

EXAMPLE V

An acetone solution of cellulose acetate and pentaerythritol tetraacetoxypropionate was spread on a clean glass plate and allowed to evaporate and dry slowly in a covered box. The glass plate was then placed in an oven for about 4 hours at 65° C. When cool, a clear, flexible, dry film was removed from the plate. The mixture evaporated was calculated to give a film composed of 75% cellulose acetate and 25% pentaerythritol tetraacetoxypropionate.

EXAMPLE VI

Following the procedure described in Example V, a film having similar characteristics was produced using pentaerythritol tetrapropionoxypropionate, dipentaerythritol hexaacetoxypropionate, dipentaerythritol hexapropionoxypropionate and tripentaerythritol octapropionoxypropionate.

EXAMPLE VII

Pentaerythritol tetrapropionoxypropionate was dissolved in a solution of ethyl cellulose (the solvent consisting of 80% toluene, 20% ethanol). The mixture was calculated to give a dry product composed of 25% pentaerythritol tetrapropionoxypropionate and 75% ethyl cellulose. The solution was spread on a glass plate and allowed to evaporate and dry slowly in a covered box. The glass plate was then placed in an oven at 65° C. for about 4 hours. When cool, a clear, flexible, dry film was removed from the plate.

EXAMPLE VIII

Following the procedure described in Example VII, a film having similar characteristics was produced using dipentaerythritol hexaacetoxypropionate, dipentaerythritol hexapropionoxypropionate, and tripentaerythritol octapropionoxypropionate.

EXAMPLE IX 35 parts of a copolymer of 95 parts vinyl chloride and 5 parts vinyl acetate were combined with 15 parts dipentaerythritol hexapropionoxypropionate on the compounding mill and the resulting sheet molded at 300° F. and 12 T total pressure for 2 minutes. The product showed satisfactory compatibility following conditioning for 64 hours at 77° F. and 50% R. H.

Having thus described our invention, we claim:
1. A compound of the general formula

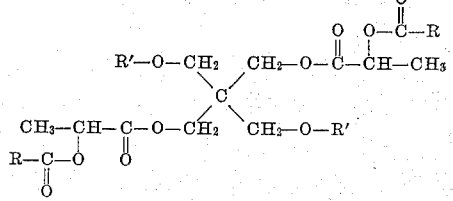

wherein R is a lower alkyl and R' is a member of the group consisting of

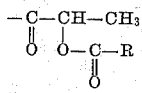

and

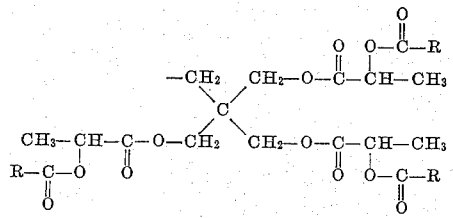

wherein R has the same significance as above.

2. Pentaerythritol tetrapropionoxypropionate.
3. Dipentaerythritol hexapropionoxypropionate.
4. Tripentaerythritol octapropionoxypropionate.
5. The compound of claim 1 wherein R is methyl.
6. The compound of claim 1 wherein R is ethyl
7. The process of preparing a compound of claim 1 comprising heating a polyhydroxy compound selected from the group consisting of pentaerythritol, dipentaerythritol, and tripentaerythritol, with a lower alkyl lactate at reaction temperature in the presence of an esterification catalyst, and with concurrent removal of the alcohol formed in the reaction, and then acylating the resulting lactic acid ester of the polyhydroxy compound by interacting it with an acylating agent.
8. The process of preparing pentaerythritol tetrapropionoxypropionate comprising heating pentaerythritol with methyl lactate at reaction temperature, in the presence of p-toluene sulfonic acid as a catalyst, and with concurrent removal of the methanol formed in the reaction, and then acylating the resulting lactic acid ester of pentaerythritol with propionic anhydride.
9. The process of preparing dipentaerythritol hexapropionoxypropionate comprising heating dipentaerythritol with methyl lactate at reaction temperature, in the presence of sulfuric acid as a catalyst, and with concurrent removal of the methanol formed in the reaction, and then acylating the resulting lactic acid ester of dipentaerythritol with propionic anhydride.
10. The process of preparing tripentaerythritol octapropionoxypropionate comprising the heating tripentaerythritol with methyl lactate at reaction temperature, in the presence of sulfuric acid as a catalyst, and with concurrent removal of the methanol formed in the reaction, and then acylating the resulting lactic acid ester of tripentaerythritol with propionic anhydride.

EDWARD M. FILACHIONE.
MARTIN L. FEIN.
CHARLES H. FISHER.

REFERENCES CITED

The following references are of record in the file of this patent:

UNITED STATES PATENTS

| Number | Name | Date |
| --- | --- | --- |
| 1,548,933 | Clarke | Aug. 11, 1925 |
| 2,072,102 | Dreyfus | Mar. 2, 1937 |
| 2,106,703 | Cox et al. | Feb. 1, 1938 |
| 2,151,185 | Carruthers | Mar. 21, 1939 |
| 2,196,758 | Dickey | Apr. 9, 1940 |
| 2,290,128 | Loder | July 14, 1942 |
| 2,356,745 | Barth | Aug. 29, 1944 |
| 2,359,750 | Collins | Oct. 10, 1944 |
| 2,374,428 | Fischer | Apr. 24, 1945 |
| 2,381,247 | Barth | Aug. 7, 1945 |
| 2,388,164 | Loder | Oct. 30, 1945 |
| 2,410,551 | Rehberg | Nov. 5, 1946 |

FOREIGN PATENTS

| Number | Country | Date |
| --- | --- | --- |
| 445,223 | Great Britain | Apr. 6, 1936 |
| 505,651 | Great Britain | May 8, 1939 |
| 508,016 | Great Britain | June 21, 1939 |

OTHER REFERENCES

"Official Digest of the Federation of Paint and Varnish Clubs" (1945), pages 493 to 503 by the Chicago Club.